US005734731A

United States Patent [19]

Marx

[11] Patent Number: 5,734,731

[45] Date of Patent: Mar. 31, 1998

[54] REAL TIME AUDIO MIXER

[76] Inventor: Elliot S. Marx, 216 Highland Ave., Winchester, Mass. 01890

[21] Appl. No.: 346,390

[22] Filed: Nov. 29, 1994

[51] Int. Cl.$^6$ .......... H04B 1/00

[52] U.S. Cl. .......... 381/119; 381/58

[58] Field of Search .......... 381/119, 55, 59, 381/58

[56] References Cited

U.S. PATENT DOCUMENTS

| | | | |
|---|---|---|---|
| 4,301,482 | 11/1981 | Trevithick . | |
| 4,774,653 | 9/1988 | James . | |
| 4,774,654 | 9/1988 | Pomerene et al. . | |
| 4,774,687 | 9/1988 | Taniguchi et al. . | |
| 4,796,247 | 1/1989 | Vogelsang . | |
| 4,870,515 | 9/1989 | Stokes . | |
| 4,871,903 | 10/1989 | Carrell . | |
| 4,972,190 | 11/1990 | Primeau et al. . | |
| 4,989,191 | 1/1991 | Kuo . | |
| 5,148,491 | 9/1992 | Sakamoto et al. | 381/119 |
| 5,212,733 | 5/1993 | DeVitt et al. | 381/119 |
| 5,230,024 | 7/1993 | Zampini et al. | 381/119 |
| 5,402,499 | 3/1995 | Robison et al. | 381/119 |
| 5,471,539 | 11/1995 | Flum et al. | 381/119 |
| 5,488,669 | 1/1996 | Zampini et al. | 381/119 |
| 5,652,797 | 7/1997 | Okamura et al. | 381/119 |

OTHER PUBLICATIONS

"An Experimental All-Digital Studio Mixing Desk"; Audio Engineering Society, 1982 vol. 30, No. 3; Richards; pp. 117–126.

*Primary Examiner*—Curtis Kuntz
*Assistant Examiner*—Xu Mei
*Attorney, Agent, or Firm*—Sullivan & Worcester LLP

[57] ABSTRACT

An audio mixer for use with audio input devices for buffering audio input signals in a dual buffering system where the dual buffering system includes a mass storage device and a dynamic storage device. The dual buffering system enables large quantities of audio data to be stored allowing audio effects and mixing capabilities including simulation of vinyl record scratching, inter alai. The audio mixer also automatically determine beats thus allowing beat skipping, automatic correction for audio input defects as well as synchronization of two or more audio inputs, inter alia.

18 Claims, 7 Drawing Sheets

REAL TIME AUDIO MIXER

BACKGROUND OF THE INVENTION

The present invention relates generally to audio systems, and, more particularly, the invention relates to audio mixing systems for mixing input from a variety of devices in real time.

Audio mixers have been utilized by the radio industry and audio enthusiasts for many years. The audio mixer takes input from a specific source and, dependent upon that a type of device the source is, the audio mixer allows options for the user to control output of the audio. As previously stated, the options depend upon the type of device and, therefore, the user wishing to control the output through an audio mixer must acquire multiple specialized mixers for each of their audio input devices, each at a prohibitive cost, which also increases system complexity.

Three types of devices commonly used with audio mixers are compact disk ("CD") players, tape players, and phonographic turntables which are with vinyl records. Generally, each of the mixers associated with the aforementioned devices have two available inputs so that one audio input, a song for example, can be cued while another song is playing. Either player can then have a playing speed and volume of each song controlled by the user. Special effects abilities, though, vary widely depending upon the input device.

At one time, vinyl records were the sound medium of choice. The analog signal recorded thereon is still today preferred by some audiophiles. For those that mix music or play music professionally, such as disk jockeys, vinyl records had many advantages over tapes and CD's due to the great degree of control over the audio output. Special effects are inherent in the turntable structure providing flexibility to the user. This is referred to as the "feel" of the device which is missing from CD and tape players and mixers. For example, a simple effect of slowing down music is performed by applying pressure to the turntable thus physically adding a resistance to the rotational motion of the turntable which, in turn, slows the output of music. A "scratching" effect is accomplished by sliding the turntable back and forth.

Tape mixers have an advantage over vinyl record mixers in that they are more vibration resistant since the playback mechanism is fixed in one position. Due to their sequential access, tape players and mixers also allow more precise control of tempo, fast forward, and rewind. A problem with tape mixers is that the sequential access makes searching a tape for a specific location difficult. Even with song beginning/end sensors such as one described in U.S. Pat. No. 4,301,482 entitled "Programmable Multi-Channel Audio Playback System for Reel-to-Reel Tapes" by Richard W. Trevithick issued Nov. 17, 1981, there is still a substantial delay while the sensors locate the proper position.

CD mixers are becoming increasingly popular as the CD is making the vinyl record obsolete. CD Mixers have features such as faster song searches, high resistance to scratches, high-quality audio reproduction, and precision cueing. In terms of special effects, some commercially available CD mixers have precision time shifting in real time in which a CD player can skip a fixed time segment. A problem with these mixers is that they do not detect downbeats and do not maintain beat skips synchronously with such a downbeat. Precision downbeat skipping would not only allow users to synchronize beats, but would also greatly simplify synchronizing to a desired song segment, for example. Additionally, current CD mixers lack the "feel" of turntables and ability to perform special effects of a vinyl record mixer.

A problem common to all of the aforementioned mixers is that changing music tempo also changes a pitch of the music. When existing devices speed up the audio output, music for example, the pitch of the audio output increases due to the increased playback rate of audio information. For example, greater than a few percent speed up makes a male bass voice sound like a boy's voice, which is often undesirable.

Another problem common to all of the aforementioned mixers is that the mixers can not automatically recover from sound defects in the playback medium. Prior art mixers, such as that shown in U.S. Pat. No. 4,796,247, incorporate a sound buffer to compensate for tracking jumps, but does not handle a common problem of scratches or other defects in the CD, or other playback medium, being played.

With regard to the special effects, professional disk jockeys requiting specialized audio effects avoid some of the limitations of current mixing systems by doing their mixing off-line where they can manipulate the audio recordings with computer assistance. This is often a slow, cumbersome process but it produces the desired effect that can later be played on the air.

Accordingly, it is an object of this invention to provide a low cost audio mixer for use with a variety of audio input devices.

It is another object of this invention to provide an audio mixer that has the "feel" and special effects abilities of a vinyl record mixer while also retaining special effects and search capabilities of CD mixers.

It is still another object of the invention to provide an audio mixer that allows a user to change music tempo without altering the pitch of the audio output.

It is a further object of the invention to provide an audio mixer which automatically recovers from sound defects in the playback medium.

It is still another object of the invention to provide an audio mixer which is fast enough to mix audio in real time.

These and other objects of the invention will be obvious and will appear hereinafter.

SUMMARY

The aforementioned and other objects are achieved by the invention which provides, in one aspect, an audio mixing system for generating a processed audio signal from audio data generated by an audio input device. The invention provides an extremely versatile audio mixer in that it receives audio signals from any audio input source be it analog or digital and mixes the audio signal per user programming. The system comprises a audio input means, buffer means and processing means.

The audio input means is adapted to receive the audio data from the audio input device thereby allowing input into the audio mixing system. The input may be an analog input in which case the audio data is passed through an analog-to-digital converter, or it can be a digital signal direct from a digital audio device.

The audio data is passed electrically into the buffer means where it is stored. The buffer means is actually two separate buffering devices, a mass storage means and memory means.

The mass storage means statically stores large quantities of the audio data and transmits the audio data upon request by the processing means. This is usually a high capacity hard disk.

The memory means provides temporary storage of the audio data transmitted by the mass storage means such that the audio data is randomly addressable by the processing means for high speed access. This is usually high speed static random access memory though dynamic random access memory could also be used.

The processing means controls data flow within the mixing system. It is user selectable between an inactive mode and an active mode. In the inactive mode, the processing means does not allow data transfers from the buffering means thus allowing the audio data to accumulate within the buffer means. Switching to the active means causes the processing means to begin withdrawing that audio data stored by the buffer means and processing the audio data to programmably alter the audio data. The audio data is altered per user instructions thus generating processed audio data.

The audio output means is in electrical communication with the processing means and is adapted to transmit the processed audio data to the audio output device. Once at the audio output device the processed audio data may be listened to or stored depending upon the type of audio output device being used.

In further aspects, the invention provides methods in accord with the apparatus described above. The aforementioned and other aspects of the invention are evident in the drawings and in the description that follows.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION

While the present invention retains utility within a wide variety of audio systems and may be embodied in several different forms, it is advantageously employed in connection with an audio system for playing music. Though this is the form of the illustrated embodiment and will be described as such, this embodiment should be considered illustrative and not restrictive.

The Invention

The invention is an audio mixer which intelligently controls information provided by audio inputs. In its simplest form, the audio mixer receives input from any audio output device and buffers the input to enable such features as cueing and tempo modification.

Figure 1:
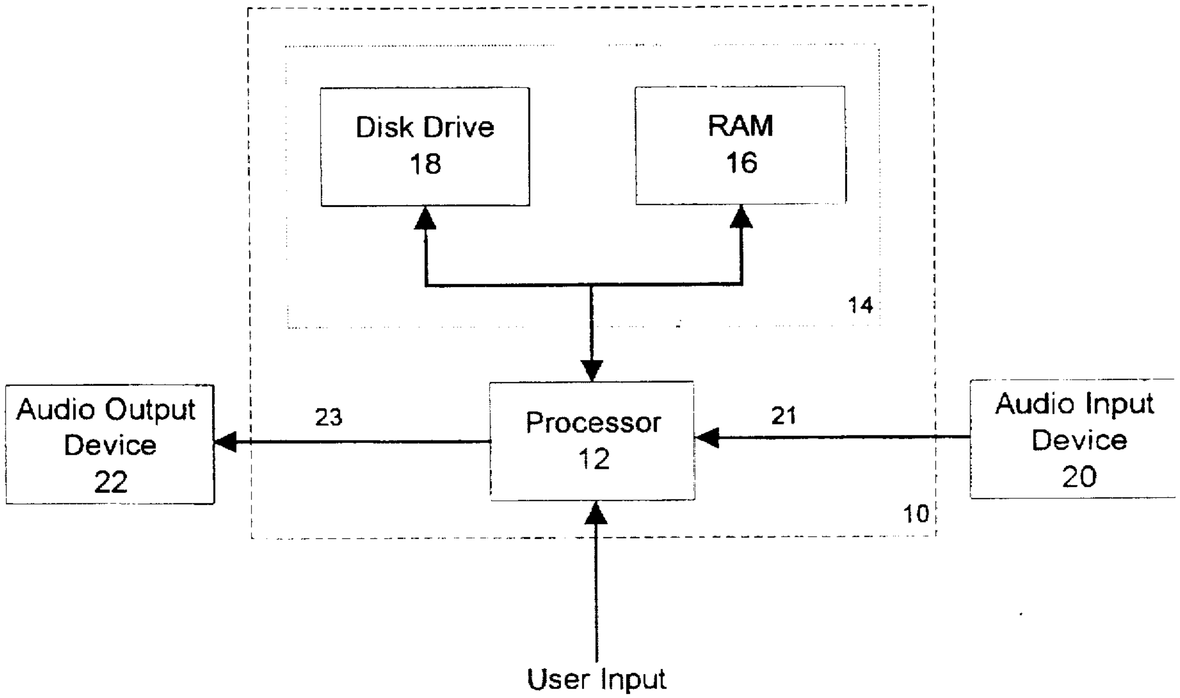
FIG. 1 shows a block diagram of an audio mixing system in accordance with the invention.

FIG. 1 shows in block diagram form basic interactions of the invention. An audio input device 20 generates an audio signal 21 which is transmitted to an mixer 10. The audio signal 21 can be music, speech, or other sounds generated from any sound generation device, such as a compact disk ("CD") player, phonographic turntable, a microphone, et cetera. In this simple example, the audio signal 21 is an analog voltage signal which is usually available at a coaxial audio output jack on the audio input 20 device.

The mixer 10 utilizes a processor 12 to selectively pass the audio signal 21 in a digitized form from the audio input device 20 into a buffer 14. The buffer 14 is a combination of random access memory ("RAM") 16 and a disk drive 18 which is used to temporarily store the audio signals.

Once stored in the buffer 14, the audio signal 21 can be processed by the processor 12 as per a user's requirements to generate a processed audio signal 23 which is then transmitted to an audio output device 22.

The audio output device 22 is often speakers so that the audio output can be heard but can also be other recording devices such as a tape recorder, transmission equipment for radio broadcast, or any of various other devices.

In practice, the mixer 10 has a power switch which is used to initiate the functionality of the mixer thereby making the mixer available to buffer of the audio signal 21. The audio input device 20 is then cued to generate the audio signal 21. Once the buffer is filled to an amount sufficient to accomplish the desired mixing, a signal is sent by the user via an external interface to the processor 12 to command that the contents of the buffer be sent to the audio output device 22. Simultaneously the buffer continues to add to the buffer overwriting audio data that has already been transferred to the audio output device 22. As the audio data passes through the processor 12, the user has complete control over the audio such that the audio can be enhanced or special effects can be generated.

Circuit Design

Figure 2A:
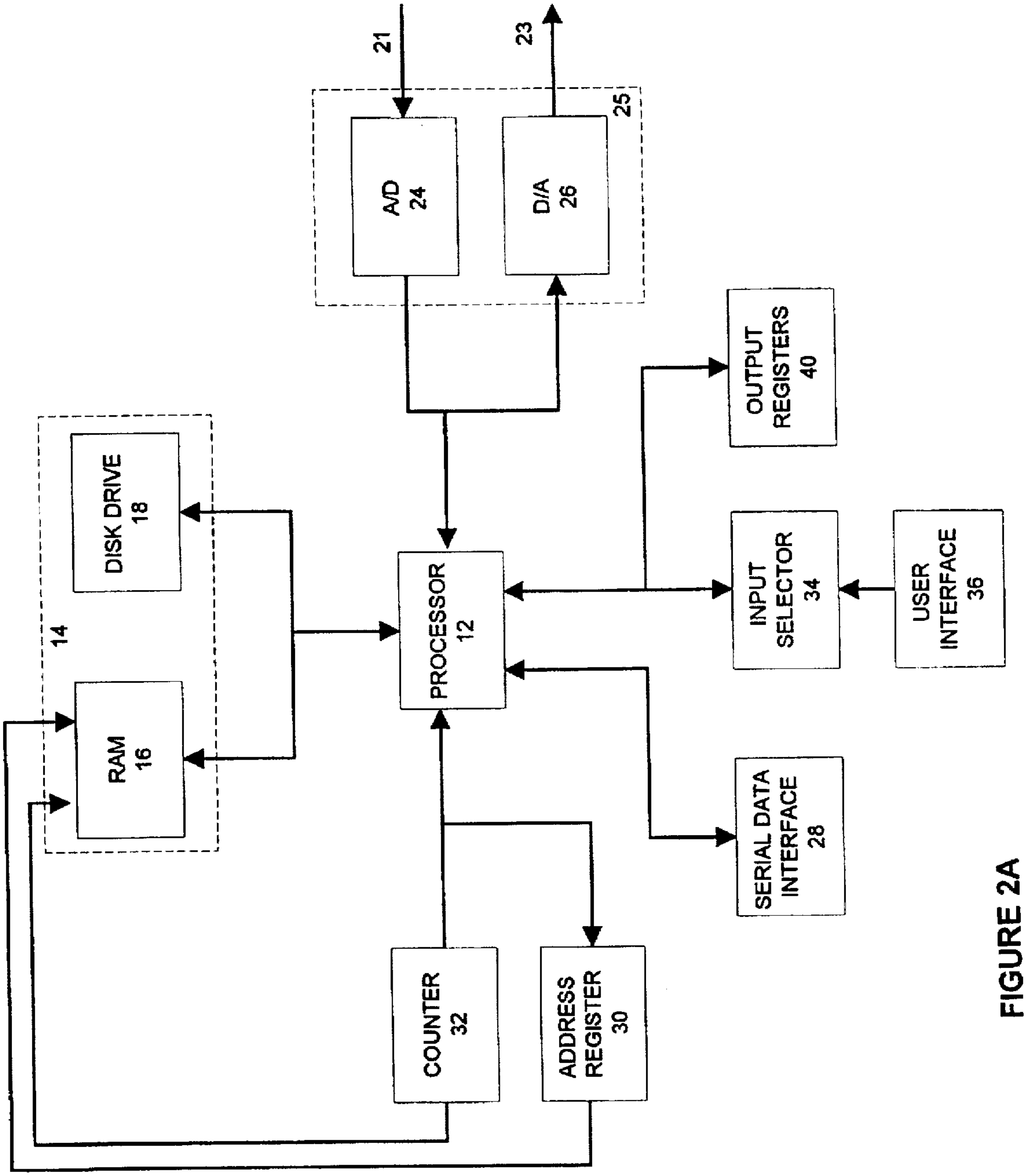
FIG. 2A shows a data flow diagram of a electrical circuit of an audio mixer as depicted in the audio mixing system of FIG. 1.

FIG. 2A illustrates the audio mixer in greater detail while continuing reference is made to the block diagram of FIG. 1.

The audio signal 21 from the audio input device 20 comes into the mixer 10 through an audio interface 25. The audio interface 25 of the preferred embodiment includes four stereo input channels of which only two can be used at any given time, and two stereo output channels. Of the four stereo input channels, two stereo input channels are for large signals generated by stereo input devices such as a tape player or a CD player for example, while the other two stereo input channels are for small signals generated by phonographs and microphones, for example. The inputs have been collectively designated as the audio signal 21.

Of the two stereo output channels, one stereo output channel provides a main audio output which transmits the audio output signal 23 representative of post-processed audio. The second stereo output channel is for use with a headphone such that the user can search anywhere in the buffer and be able to listen through the headphone to segments of the buffer without it being audible on the main audio output.

The audio signal 21 once received through the audio interface 25 is digitized by an analog-to-digital converter 24 which forms, in the preferred embodiment, a 16-bit digital signal. One skilled in the art will realize that the signal can be digitized to more or less bits without detriment to the concept of the invention.

Likewise, audio output to the audio interface 25 is provided in an analog format through a digital-to-analog converter 26, thus providing analog input/output ("I/O") ports according to industry standard practices.

The mixer 10 can also receive direct digital data signals from an audio input device having a 16-bit digital output. The digital data signal can be transmitted directly from a digital audio device such as a digital audio tape ("DAT") or a CD player into the mixer through a digital port (not shown) such as a serial or parallel communication port.

The digital signal is then passed via the processor 12 to the buffer 14 which is a dual mechanism including both the RAM 16 and the disk drive 18. This buffer 14 provides the disk drive 18 which has sufficient capacity to buffer several minutes of audio I/O, and the RAM 16 which allows the processor 12 to process audio I/O without interruption during disk drive memory seeks taking up to 25 milliseconds.

The disk drive 18 continuously receives the digital signal storing the digital signal as audio data. Even once the processor 12 begins retrieving the audio data from the disk drive 18 the processor continues to store audio data on the hard disk 18 eventually overwriting the audio data which has been transferred out to the audio output device 22.

An end-of-buffer pointer is also stored indicating a location of audio data not yet sent to the processor 12. The disk drive 12 continues to store data until this end-of buffer pointer is reached thus ensuring that unplayed data does not get lost.

The processor 12 controls the flow of audio data between the audio interface 25, the buffer 14, and the audio output device 22. The processor 12 exercises this control according to the user's design as communicated through a user interface, later herein described.

The processor 12 is enabled to perform a wide variety of signal processing and preprogrammed functions as well as govern all I/O within the mixer 10. In the preferred embodiment, the processor 12 that accomplishes these tasks is a dedicated digital signal processor.

The user governs the more subjective aspects of the mixing process. For example, the amount of audio information buffered is controlled by the user. The user initiates power to the mixer 10 which begins audio input to the mixer 10. This is called pre-loading the mixer 10.

Once sufficient audio information is stored in the buffer 14, the user signals the mixer 10 to begin audio output. An actual amount of audio information stored within the buffer 14 before playing the audio is based generally on an intended use of the mixer 10. If the user wishes to accelerate the audio output, for example, then the buffer must be preloaded to avoid interruption of the audio output as it is played. Also, if special effects are to be used then a larger amount of buffered audio information presents a wider array of mixing options. But, if the user simply wishes to slow down a tempo of music then no pre-loading of the buffer is necessary since the buffer will be faster than the output and will fill as the audio is play.

The processor 12 makes decisions on how to process the audio data based on the instructions provided by the user via the user interface 36. The user interface 36 is shown in more detail in FIG. 2B as a series of controls which provide the "feel" of the turntable as previously mentioned while allowing the precision of digital audio systems. The feel is accomplished by providing a small turntable 42 on the order of six inches diameter which is driven to spin at thirty-three and one third revolutions per minute, i.e. the speed of a turntable for conventional vinyl records. Through the turntable 42 the user can physical slow the spinning or "scratch" the record as will be described hereinafter. The mixer 10 then interprets speed changes and the processor 12 adjusts the output accordingly.

In a second embodiment of the invention, two or more turntables are used to provide the above-described effects to multiple input channels and to assist in "manually" mixing to or more audio inputs. A third embodiment replaces the turntable 42 with a series of slide controls and knobs for a more compact interface.

The user interface 36 also presents an array of pitch, speed, and tone controls 44 as well as standard functions such as fade, base, treble, et cetera, for precisely governing audio output. Light emitting diodes ("LED"'s) or a liquid crystal displays ("LCD"'s) are also incorporated as displays 45 for conveying information such as number of beats and audio output velocity, for example.

The input from the user interface 36 is presented through an input/output selector 34 which selects data for loading into the processor 12. Other inputs (not shown) that come in through the input selector includes, but is not limited to, A/D readings, button position status, and IDE drive status bits.

The processor 12 is also programmable remotely. This is accomplished via the serial port interface (RS-232) for allowing bi-directional communication with a remote computer. In the preferred embodiment the serial port speed is 2400 baud, though higher data speeds are available dependent upon a choice of processor.

Once the user determines that sufficient audio data has been stored within the buffer 14, the mixer is engaged. This is a manual operation unless the buffer becomes completely filled in which case engagement is automatic to avoid data loss.

Once the mixer 10 is engaged, the audio data is withdrawn from the buffer 14 and is passed through the processor 12. While this occurs, audio input continues to flow in through the audio interface 25 into the buffer 14. The simultaneous reading of audio input and providing of audio output is performed in the preferred embodiment through a high-speed, 6 million baud in the preferred embodiment, serial interface between the processor 12 and the A/D 24 and D/A 26 converters.

The processor 12 then processes the audio data withdrawn from the buffer 14 according to user requirements while presenting visual indications to the user via the input/output selector 34. The input/output selector 34 allows the processor 12 to access the displays 45 on the user interface 36 to present information such as tempo, song time remaining, and percentage of buffer capacity used.

Figure 2B:
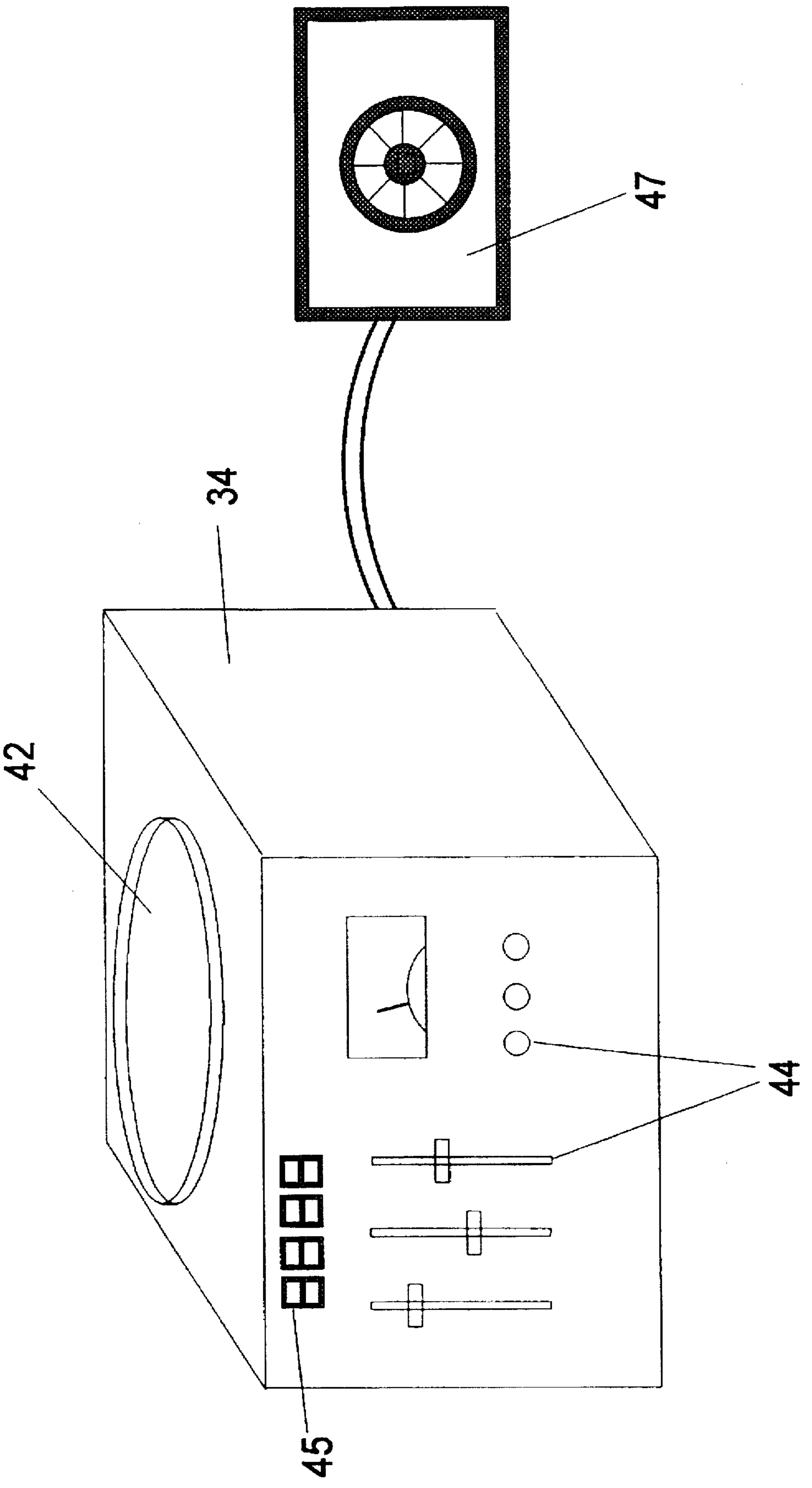
FIG. 2B shows an illustration of an embodiment of the user-interface.

The user interface 36 also provides ports for peripheral devices to be driven therefrom. For example, FIG. 2B shows a strobe light 47 which is triggered by the user interface 36 to repetitively flash light. An interval over which the strobe light 47 is triggered is selectable to be according to a beat of the audio, each down beat of the audio, inter alia. The strobe light 47 can be any of various peripheral devices commonly found in the art. Other examples echo boxes, colored lights, robots, inter alia.

As previously stated, all computation and data handling is controlled by the processor 12. In the preferred embodiment, the processor 12 runs at twelve megahertz enabling the processor 12 to perform multiplications as well as data transfers to and from RAM 16 in less than one hundred nanoseconds. Data transfers to and from the disk drive 18 are primarily dependent upon a choice of protocol such as MFM, IDE, SCSI, et cetera. In the preferred embodiment, an IDE protocol is used enabling data transfers of less than two hundred nanoseconds. These high speeds are necessary to handle the massive number of multiplications including scaling and real-time filtering as well as volumous data transfers on the order of 44.1 kHz of 16-bit audio on 8 channels.

One way the mixer 10 accomplishes such high-speed transfers is by treating each memory location in the buffer 14 as if it were a high-speed register. Thus, once the processor 12 selects the initial memory location, the processor 12 continuously accesses consecutive memory locations thereby saving processing time.

For the processor 12 to perform these high-speed functions adequately, the processor 12 must be enabled to perform memory "dumps" to and from the RAM 16. A dump is a bulk transfer of data of between 16 and 256 consecutive words of data, in the preferred embodiment. Performing "dumps" in this way allows the processor 12 to access memory more rapidly by loading the data into an internal cache within the processor than if it had to reload each time, thus saving critical processing time.

For example, the maximum sustained rate of these memory dumps for the disk drive of the preferred embodiment is approximately 1 million words per second.

Each time a dump is performed by the processor 12, an address register 30 is automatically incremented. This allows the processor 12 to accurately track what data has already been read into the processor 12.

For each of the two stereo input channels, a block is specified in the RAM 16 which consists of at least ±½ second worth of audio information preceding and following present sound transmitted from the disk drive 18. The RAM 16 is therefore artificially segmented and can be thought of as two distinct buffers, one for each of the two stereo input channels.

A size of the block is hardware dependent in that greater hard disk access times require greater block sizes. In the preferred embodiment, the disk drive 18 has a maximum access time of approximately twenty-five milliseconds and, therefore, data must be transferred to the disk drive 18 in blocks which are a minimum of 13 milliseconds long to sustain the transfer rate. Choosing block size that is larger allows additional storage for disk drive malfunctions in that additional information would be available to the processor 12.

Like the disk drive 18, the RAM 16 has pointers. First, an audio output pointer which indicates a beginning of audio data that has yet to be sent to the processor 12. A second pointer, an end-of-buffer pointer, indicates that last position new audio data has been written in the RAM 16. As the audio data is transmitted to the processor 12, the audio output pointer is incremented. New audio data is then read in from the disk drive 18 to replace audio data older than one half second and that new data is written at a location pointed to by the end-of-buffer pointer.

In each of the blocks, the audio information preceding the present sound is "leading sound" which consists of sound that has already been sent to the audio output device 22. The audio information following the present sound is "lagging sound" which consists of sound that has been loaded into the buffer but not played yet.

An overlap such as the one described above between the RAM 16 and the disk drive 18 eliminates a need maintaining separate "leading sound" and "lagging sound" buffers and rewriting separate audio data back to the disk once it is played.

The audio information is continuously loaded into the "two" RAM buffers from the disk drive 18. In the preferred embodiment this is performed at 44.1 kHz and with 16-bit resolution, the standard for CD quality audio. With two channels and two outputs per channel, this corresponds to a data transfer rate of 176,400 words per second.

The audio information is read by the processor 12 according to the needs of the processor 12 as determined by the user's mixing choices. The mixing choices can be any of various signal processing and filtering functions or can include mixing along one of three preprogrammed "modes" of the mixer 10.

Once the processing is complete, processed audio data is sent out to an awaiting output device 22 as previously described.

Operating Modes of the Invention

Figure 3A:
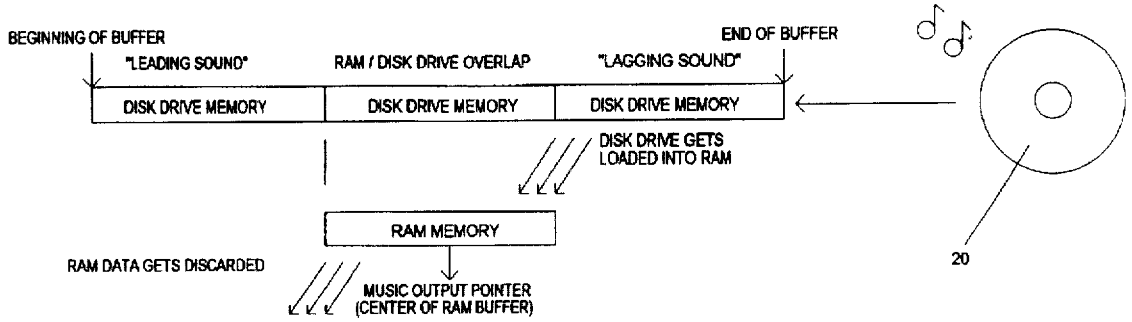
FIG. 3A–C graphically illustrate operation of the audio mixing system in each of three modes of the invention.
Figure 3B:
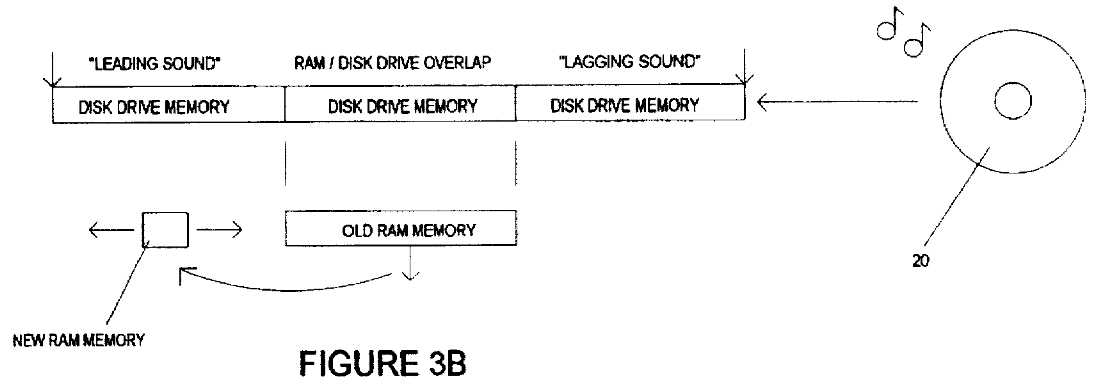
Figure 3C:
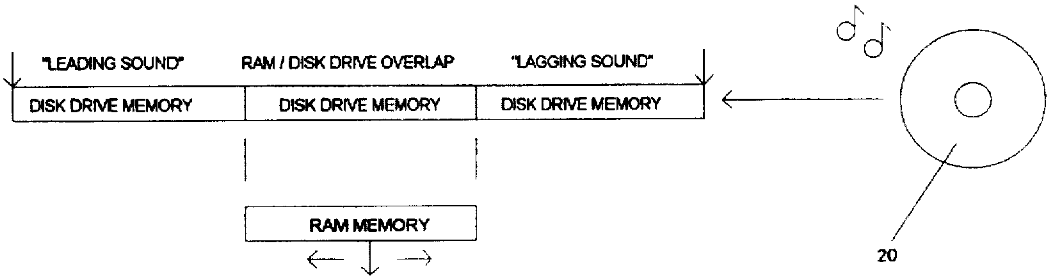

The mixer has three distinct modes of operation which are called "play" mode, "skip" mode, and "scratch" mode and are shown in FIG. 3A, 3B, and 3C, respectively. The user chooses the mode of operation through the previously described user interface 34 based upon a desired output.

The "play" mode makes extensive use of the segmented RAM 16 buffer which is divided into a first buffer and a second buffer. The first buffer and the second buffer each load "lagging sound" into RAM memory at approximately 88,200 words per second for a total of 176,400 words per second. There is an additional equivalent 176,400 words per second due to an equivalent amount of data loaded from audio inputs directly to the "lagging sound" buffer. Given the previously described transfer rate for the preferred disk drive 18, loading the buffers at the aforementioned rates leaves 647,200 words per second in the disk drive transfer rate.

In addition, the headphone jack has a buffer which may be one of the two input buffers since it does not have to handle audio input from an external audio device. The only data transfer is from the disk drive memory to the buffer RAM, adding an extra 88,200 words per second. This operation is desirable so that the user can search the entire disk drive memory while the first buffer is playing and the second buffer remains cued up or vice versa.

The "play" mode allows the user to accelerate and decelerate audio output, music for example. For audio acceleration, the buffer 14 must be loaded with enough audio data to ensure that while the music is playing, the audio output pointer does not overtake to the end-of-buffer pointer. This can occur when the audio output to the audio output device 22 is faster than audio input from the audio input device 20. Therefore, the user must pre-load a significant quantity of audio data to avoid this situation. The actual quantity will be dependent upon an amount of audio acceleration desired by the user.

For audio deceleration, the buffer does not require preloading. As the audio is transmitted, the amount of audio data in the buffer increases since audio data is being transmitted to the audio output device 22 at a rate that is slower than a rate of audio input from the audio input device 20 being stored in the buffer 14. The buffer, though, must have a capacity large enough to accumulate the audio data overflow to avoid audio data loss. In the preferred embodiment a 270 megabyte capacity disk drive is used.

Another feature available in "play" mode is automatic mixing of audio from a single audio device 22. For example, a user may desire to eliminate the 15 second dead space between songs on a music CD while the disk player is finding a new song plus the additional 15 seconds of fadeout from an ending song. To accomplish this, the user pre-loads 30 seconds of music data into the buffer 14 and during fadeout initiates the mixer 10 begin audio output.

The 30 seconds of music roughly corresponds to 5.28 Mbytes of data. Thus, with a 105.6 MByte buffer, or 10 minutes of pre-loaded audio data, up to 20 songs can be automatically mixed using this scheme. Assuming an average song of 5 minutes, this requires only 10% as much buffer as would be required by pre-recording the entire songs on the disk drive 18.

In "skip" mode, the RAM 16 is loaded with new audio data from the disk drive 18. Once the RAM 16 begins loading, the audio output pointer is moved to the beginning location in the RAM 16. In the case of music, a skip can then be made to occur synchronously with beats of the music once a beat is detected. The processor 12 now has sufficient information to automatically to skip over dead space and jump from one detected beat to another detected beat to eliminate interruptions in audio flow. This requires that there is enough RAM 16 available to allow the processor 12 time to detect the interruption and find the new beat before the audio output pointer reaches the interruption. In this way the mixer 10 can automatically detect flaws in the audio data and correct for the flaws.

In "scratch" mode, the audio output pointer is shifted forward and backward within the RAM 16 block. This must happen within the RAM 16 block since the disk drive 18 access may be too slow for immediate playback depending upon the choice of hard disk. RAM 16 space for ±½ second of audio data is allocated for this function.

Beat Detection

Figure 4:
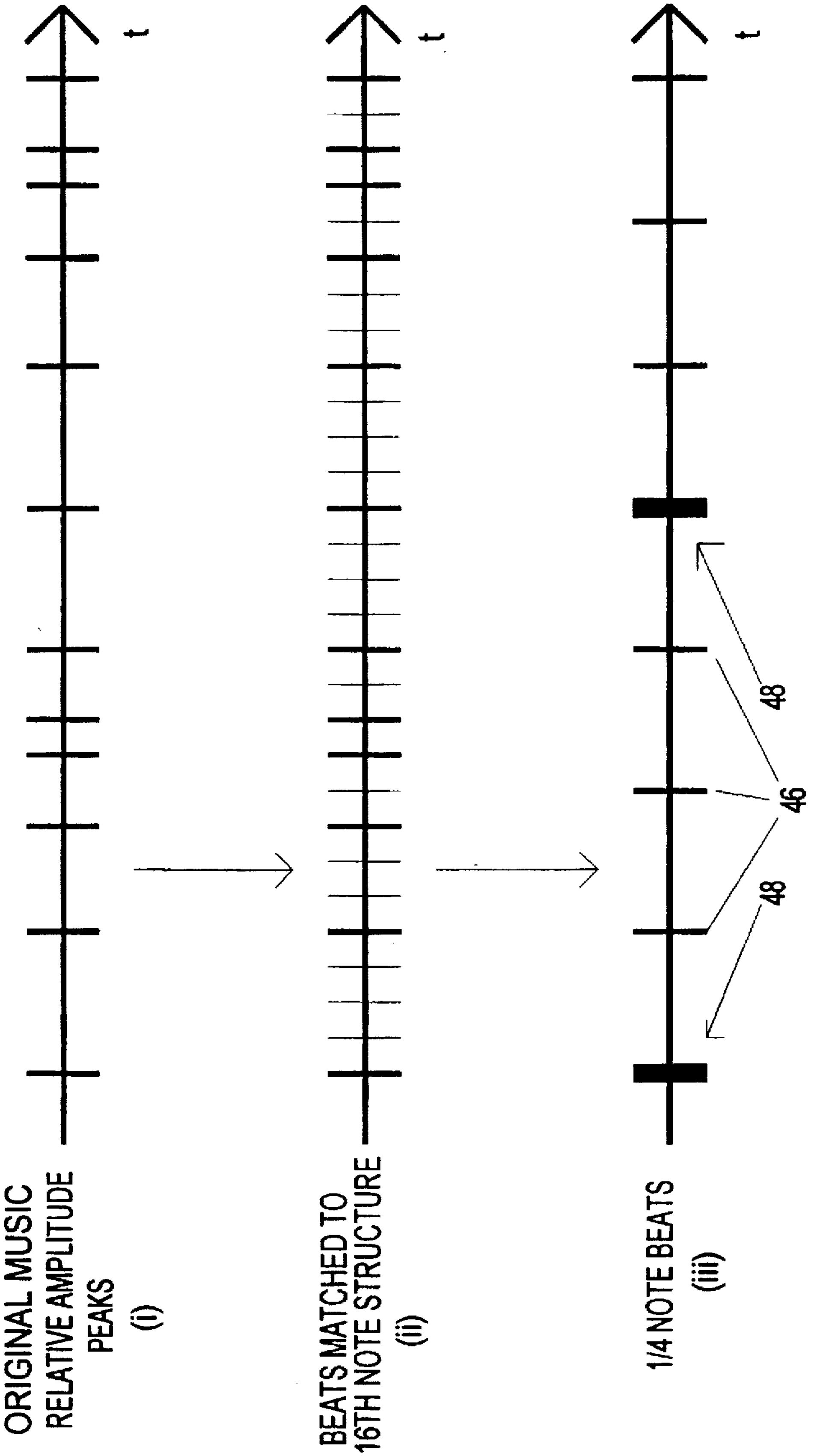
FIG. 4 shows a series of time lines demonstrating beat detection by the mixing system of the invention.

Shown in FIG. 4 are a series of time lines to illustrate beat detection. Beat detection is primarily used for music audio and will be described as such.

First, the processor 12 attempts to match all of the relative amplitude peaks of the music (i) with a sixteenth note musical structure (ii) to determine a tempo of the music. The processor 12 determines a tempo for which the sixteenth notes and musical peaks and musical beats have an optimal similarity by calculating a summation of time mismatches between the music (i) and the sixteenth note musical structure weighted by the peak magnitudes. Next, a similar comparison is made to a quarter note musical structure. A third attempt is made used a triplet musical structure with triplets to each quarter note. The processor then determines the musical structure having the fewest mismatches to be a "best fit" which is in the case sixteenth notes. In the event that there are multiple "best fit"'s with sixteenth or triplets notes, the optimal quarter note structure selects the one "best fit."

This tempo is selected out of a range which encompasses most classes of popular dance music. In the preferred embodiment the range is restricted to dance music having 81 to 160 beats per minute. Furthermore, since no tempo is one half or double any other tempo within this range, the tempo selected is unique as far as the processor 12 is concerned. This tempo can alternately be selected for specific types of dance music such as swing, merenge, et cetera.

Once this musical structure is determined, quarter note "beats" 46 are determined by finding a quarter note interval (iii) which most frequently lands on an actual music relative peak. In the event that matching quarter notes is unsuccessful, the processor 12 matches the beat pattern with known patterns stored in a lookup table. The music is then passed through a bandpass filter to sort out either bass drums or high-pitched cymbal crashing sounds that are defining the beat and eliminates vocals or synthesizers which can distort the beat.

Once quarter note beats are located, the processor 12 finds downbeats 48. Downbeats are the first quarter note of every measure. Popular music has four quarter notes per measure. Analytically, downbeat are either the strongest relative peaks of the music or the initial beats of the pattern found in the lookup table. In a vast majority of songs the downbeat is the initial beat of the song. For minimizing time required to detect the beat, the processor 12 first assumes that the first beat is the downbeat, and the next beat is the quarter note beat.

Once these beats are detected and known by the processor 12, the processor 12 can automatically synchronize music defects to the next downbeat or the user can skip any given number of beats.

Another use for downbeats is mixing itself. Two songs can be mixed once downbeats are known by time shifting a second song to match the downbeat of a first song which may be ending, for example, thus allowing the second song to fade in while the first song is fading out whether or not the tempo of the second song matches the tempo of the first.

A problem that occurs in beat detection is that once a down beat is located and a tempo is determined, any inaccuracy in the tempo calculation will have an additive affect over the course of the song. A segmentation interval is used to control the audio output. The segmentation interval is a time segment of digital audio which is either partially repeated to slow down music or is prematurely terminated to speed up music. The entire song is divided into a continuous stream of segmentation intervals. Therefore, the segmentation interval is automatically adjusted slightly, lengthened or shorted, by the invention to match the assumed beats to the actual beats. This adaptation allows the segmentation interval to remain synched to the music even with a song having a changing tempo.

Tempo Modification without Pitch Modification

Figure 5:
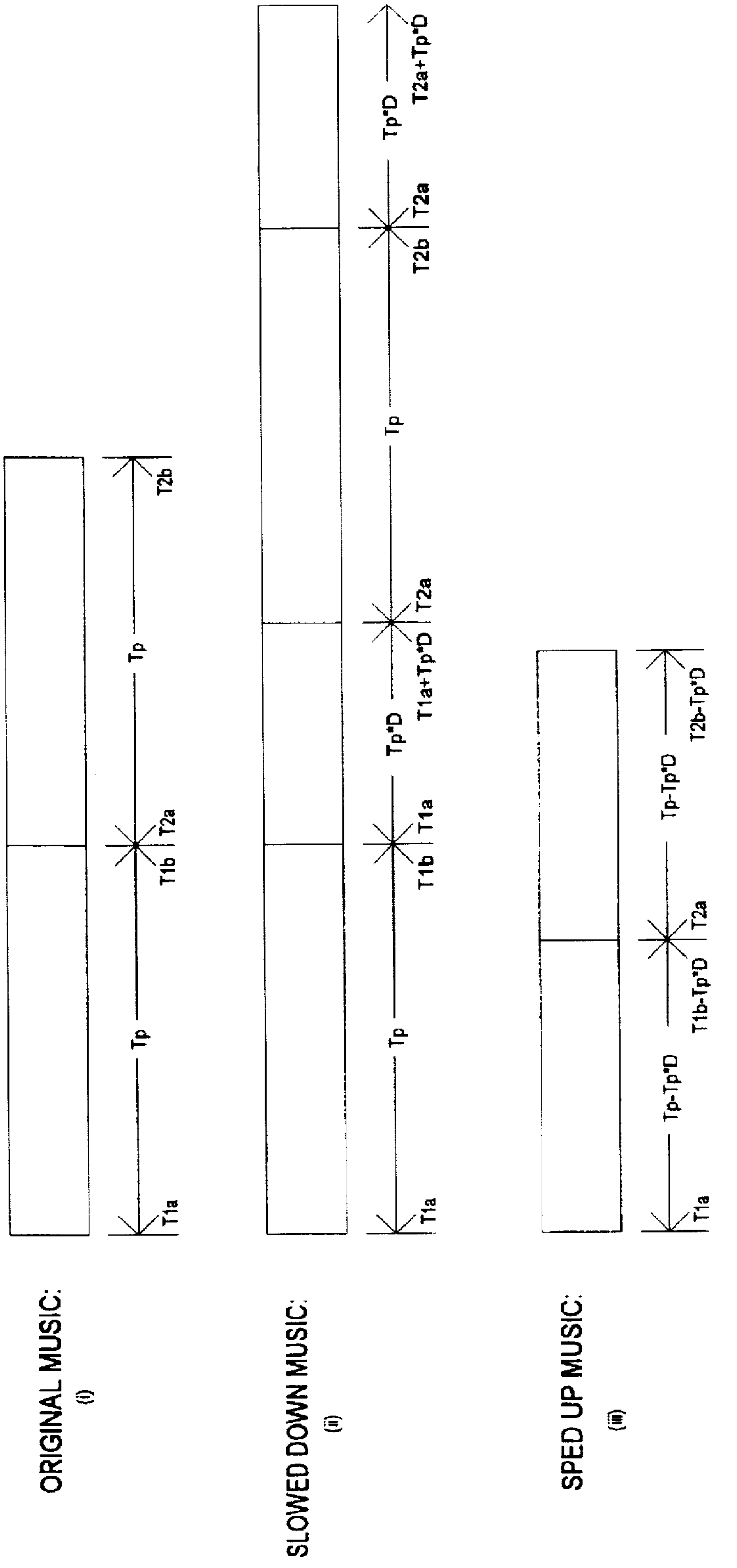
FIG. 5 illustrates tempo modification by the mixing system of the invention without altering audio pitch.

The mixer 10 of the invention allows the user to decide if the tempo modification is done with or without pitch modification. FIG. 5 illustrates how this mixer 10 of the invention accelerates and decelerates the music without pitch modification.

When audio output is accelerated or decelerated thereby changing tempo, an often noticeable change in pitch occurs. When accelerating music, for example, a user hears this as a distortion making the song incomprehensible and squeaky. When decelerating music the song sounds deep with long drawn out annunciations. The mixer of the invention allows an option of avoiding pitch changes by automatically choosing an optimal music segmentation interval. In FIG. 5 the segmentation interval is marked $T_p$ and the beginning and end of a first segmentation interval are indicated as $T1_a$ and $T1_b$, respectively.

In choosing the optimal music segmentation interval, two factors are considered. First, the music segmentation interval must be short enough that phrasing, i.e. changes in loudness and note attacks, are maintained. Second, the music segmentation interval must be long enough that a pitch of the music is not distorted. Both of these requirements are met by selecting the music segmentation interval, $T_p$, to be exactly one sixteenth note which is 3/32 of a second at 160 beats per minute, for example. One skilled in the art will realize that this amount will vary depending upon a tempo of the music.

For example, the music segmentation interval will be longer for music having a slower tempo.

If the music is decelerated (ii), part of this segmentation interval is repeated. A percentage of speed increase, D, is taken from a tail section of the segmentation interval and is repeated. The segmentation interval in graphical form consists of a series of damped oscillations where the first oscillation having the greatest amplitude determines the note and is the most perceptible portion of the interval. The tail to the oscillations as it approaches the next segmentation interval have minute amplitudes in comparison and, therefore, repetition of these tail sections are ostensibly inaudible. Thus, the pitches contained in that interval are maintained for the next music fragment.

A problem that arises in performing this simple audio addition is that when the tail is repeated, the beginning of the repeated section often does not meet with the end of the previous segmentation interval. This is called a discontinuity in the audio signal.

Discontinuities in the audio signal are audible as a cracking or popping sound. The invention, therefore, introduces a low frequency distortion that is inaudible to essentially remove the discontinuities.

A low frequency saw-tooth waveform is added to the region of the audio signal where the two audio segments have been joined. The saw-tooth wave then, for example, pulls the end of the previous segment up and pulls the beginning of the new segment down to form a continuous audio signal. One skilled in the art will realize that other low frequency signals could also be used in place of the saw-tooth wave to remove the discontinuity.

If the music is accelerated (iii), part of the tail section of each segmentation interval is abbreviated by removing a percentage, D, of the tail section of the segmentation interval. Thus, each individual note is maintained but for a shorter time thereby ensuring a constant pitch.

In either case, within each segmentation interval, the music is played at the same speed as it would with the original music. This causes the ear to detect the same pitch for the original music or music sped up as above.

Tempo Modification with Pitch Modification

It is also possible for the processor 12 to speed up or slow down the music by effectively speeding up or slowing down the sampling rate. Since it is impractical to obtain high-resolution sampling rate interval modification on clocked A/D or D/A systems, this is effectively accomplished by using one unique sampling rate and interpolating what the output at given time intervals should be.

This is effectively the same as physically slowing down or speeding up an audio output device. It is added as an option just in case the user is transmitting audio that is effected by the above-described low-pitch distortion.

Alternative Embodiment

Figure 6:
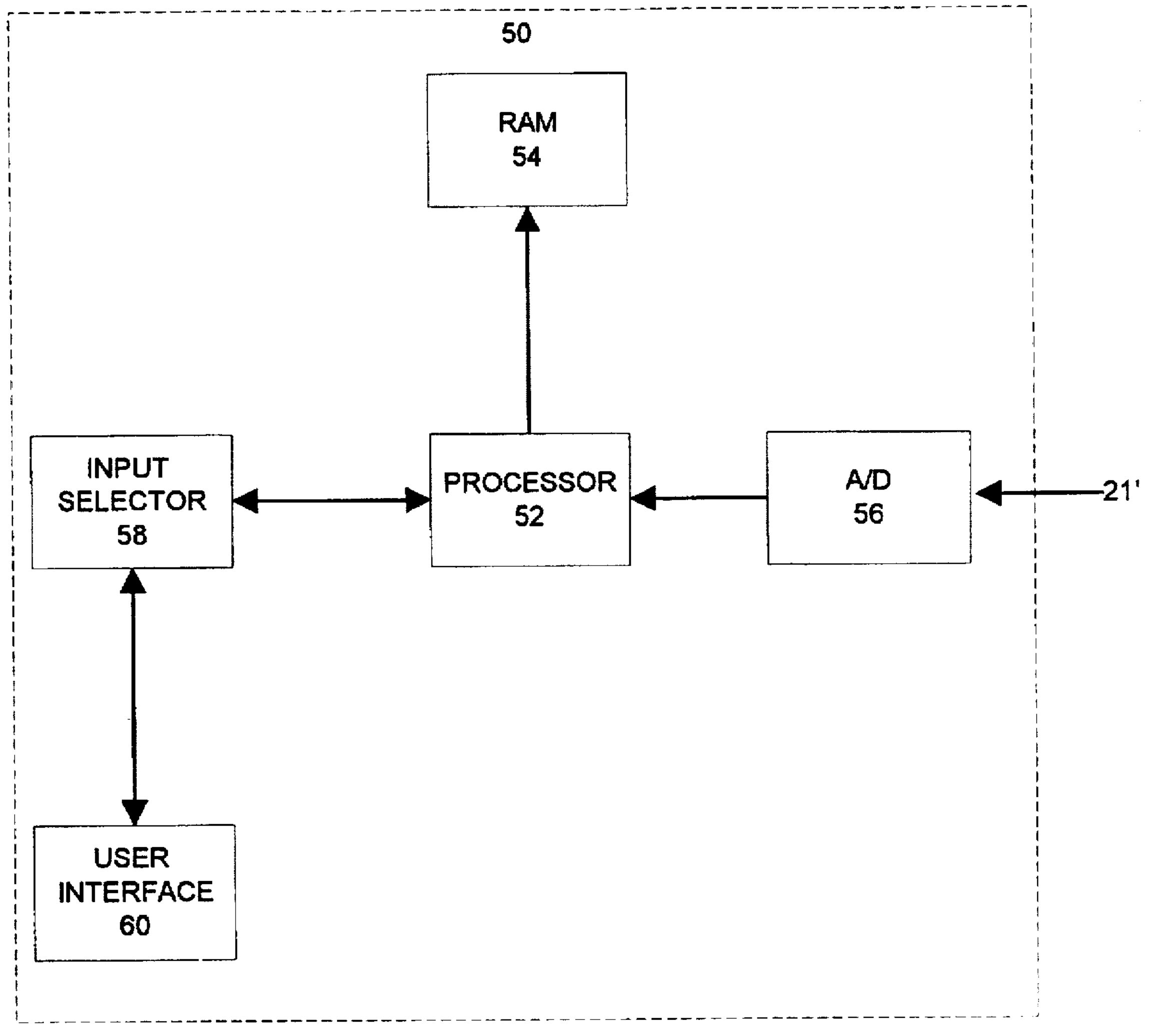
FIG. 6 shows a block diagram of an alternative embodiment of an audio mixing system in accordance with the invention.

The invention can also be broken into a subset of its components to provide having only selected ones of the aforedescribed features. An example of which is shown in FIG. 6 in which the audio mixer 50 detects beat and provides a user interface having information regarding these beats. The audio mixer 50 has a processor 52, RAM 54, an A/D 56, an input selector 58 and a user interface 60 which work in together to provide this information. The features provided are restricted to the aforementioned beat detection and synchronization which are performed as previously described herein.

The RAM 54 constitutes the entire buffer and, in the preferred form of this embodiment, has one kilobyte of storage capacity. The storage requirements are significantly reduced by this subset of features since information retained by the system can be limited to beat magnitudes and times, average audio power (volume),short-term average (relative magnitude), timers, inter alia.

In this embodiment, the A/D 56 is an 8-bit analog-to-digital converter. The number of bits can be reduced as compared to the prior embodiment due to the type of information garnered from the audio signal. Here, the peaks of beats are being detected which have an amplitude significantly greater than neighboring peaks and, therefore, remain recognizable with less digital granularity.

The output channels can also be merged in this embodiment. Instead of providing separate low-level (microphone) and high-level channels, a single channel with adjustable gain can be used to provide adequate fidelity.

The user interface 60 is modified to include two LED displays which show beats per minute of each of two audio input channels. For example, the number "120" will be displayed for a song having 120 beats per minute. Each channel also has a separate beat LED which flashes on each quarter note beat. The beat LED can be selected through the user interface to indicate a variety of beat patterns such as flashing on every detected beat, flashing to a standard rhythm such as swing, waltz, merenge, et cetera, for either of the audio inputs.

As before, a peripheral interface is provided which is selectable of receive any of the aforementioned beat signals. In this way the invention can trigger a strobe light, for example, according to the beat of the song.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. An audio mixing system in electrical communication with an audio input device which generates audio data having a pitch, and in electrical communication with an audio output device, said audio mixing system comprising:
   - audio input means adapted to receive said audio data from the audio input device;
   - buffer means in electrical communication with said audio input means for storing said audio data;
   - processing means selectable between an inactive and an active mode, the inactive mode for accumulating the audio data within the buffer means, the active means for withdrawing said audio data stored by the buffer means and processing the audio data while continuing to receive the audio data within the buffer means;
   - pitch means disposed in the processing means for maintaining the pitch of the audio data at a substantially constant level when a speed of output of the audio data to the audio output device is accelerating or decelerating and for determining a segmentation interval representative of a portion of the audio data over a time period and determining a modification factor that is the time period multiplied by a predetermined percentage of the speed of output and selectively altering the audio data by a portion of the segmentation interval by selectively modifying the audio data in the time period by the modification factor such that the audio data so modified maintains the pitch of the audio data not so modified and transmitted while the speed of output of the audio data so modified to the audio output device is accelerated or decelerated; and audio output means in electrical communication with said processing means adapted to transmit said processed audio data to said audio output device.

2. The audio mixing system according to claim 1 wherein said buffering means comprises mass storage means for statically storing large quantities of said audio data and, in the active mode, for transmitting the audio data upon receiving a request signal by said processing means; and memory means for providing dynamic storage of the audio data transmitted by said mass storage means such that the audio data is addressable by said processing means.

3. The audio mixing system according to claim 2 wherein said memory means is continuously refreshed from said mass storage means in such a way that the memory means always contains a first block of audio data that has already been sent to the audio output means and a second block of data that has not yet been sent to the audio output means.

4. The audio mixing system according to claim 3 wherein said first block of audio data is sufficient to produce at least one half second of audio output to said audio output means.

5. The audio mixing system according to claim 1 further comprising a turntable which is a drive to rotate at a substantially constant rotational velocity, said turntable in electrical communication with said processing means such that changes in said rotational velocity are transmitted to said processing means such that the processing means adjusts the audio data received from the audio input device to flow according to the changes in rotational velocity of the turntable.

6. The audio mixing system according to claim 5 wherein said turntable is adapted to be manually rotated in a backward and forward motion which causes the processing means to transmit processed data simulating a scratching of a vinyl record.

7. The audio mixing system according to claim 1 wherein said processing means further comprise down beat means for tracking down beats by determining a period of peak amplitudes within the audio data and for utilizing the down beats to avoid imperfections in the audio data by skipping to a next consecutive down beat.

8. The audio mixing system according to claim 1 wherein the pitch is maintained by repeating the portion of the segmentation interval during acceleration of the output of the audio data and subtracting the portion of the segmentation interval during deceleration of the output of the audio data.

9. The audio mixing system according to claim 8 wherein the portion of the segmentation interval is taken from a tail section of the segmentation interval consisting of oscillations having small amplitudes relative to a beat.

10. The audio mixing system according to claim 9 wherein said portion of the segmentation interval is added with a low frequency distortion to substantially eliminate a discontinuity between an end of a segment defined by the segmentation interval and said portion of the segmentation interval being appended.

11. The audio mixing system according to claim 10 wherein said low frequency distortion is a saw-tooth waveform which pulls the end of said segment up and pulls a beginning of the portion being appended down to form a continuous audio signal.

12. The audio mixing system according to claim 8 wherein said processing means is adapted to automatically synchronize two or more audio input signals by adjusting segmentation intervals.

13. A music mixer for determining a beat of a song from a music input device said sound mixer comprising:

an audio input adapted to receive a music signal representative of the song from the music input device;

processing means in electrical communication with the audio input for analyzing said audio data to determine a tempo by locating peak relative amplitudes of the audio data and comparing the peak relative amplitudes to a predetermined note structure to determine a best fit between the relative peak amplitudes and the predetermined note structure, the predetermined note structure having a reference number of beats per minute and at least one tempo representative of the reference number of beats per minute; and beat means disposed in the processing means for comparing note intervals, which are compatible with the at least one tempo, to the relative peak amplitudes and generating beats representative of a one of the note intervals, where the beats of the one of the note intervals substantially coincides with the relative peak amplitudes of the audio data.

14. The music mixer system according to claim 13 further comprising:

user interface means in electrical communication with said processing means for displaying information relating to the beat of a song; and an output port disposed upon the interface means adapted to output a driving signal from the user interface means where the driving signal is selectable to indicate beat information and said driving signal is usable by a peripheral to indicate said beat information.

15. The music mixer system according to claim 13 further comprising memory means in electrical communication with said processing means for dynamically storing said beat information therein.

16. A method for mixing a first audio signal from an audio input device and a first processing signal from a turntable device to produce an audio output signal, said method comprising:

receiving first audio signal from the audio input device;

storing said first audio signal;

determining beats by comparing relative amplitude peaks in first audio signal to predetermined note structures having predetermined beats and generating beats of the audio signal that correspond to the predetermined beats of one of the predetermined note structures;

receiving first processing signal having a user selected number of beats per minute from the turntable device generated by actuating the turntable device, where the user selected number of beats per minute is representative of a change in a tempo of the audio signal; and selectively processing the first audio signal such that the first audio signal is drawn from storage and is programmably altered in accordance with the first processing signal to generate the audio output signal.

17. A method according to claim 16 further comprising a step of determining a down beat as a strongest relative beat a measure and a subsequent beat as a quarter beat.

18. A method according to claim 16 further comprising a step of synchronizing the first audio signal to a second audio signal by altering a segmentation interval of the second audio signal.

* * * * *